United States Patent
Brower

(10) Patent No.: US 11,824,384 B2
(45) Date of Patent: Nov. 21, 2023

(54) MODULAR DEVICE CHARGING SYSTEM

(71) Applicant: Hubbell Incorporated, Shelton, CT (US)

(72) Inventor: John Brower, Fairfield, CT (US)

(73) Assignee: Hubbell Incorporated, Shelton, CT (US)

(*) Notice: Subject to any disclaimer, the term of this patent is extended or adjusted under 35 U.S.C. 154(b) by 12 days.

(21) Appl. No.: 17/572,327

(22) Filed: Jan. 10, 2022

(65) Prior Publication Data

US 2022/0209555 A1 Jun. 30, 2022

Related U.S. Application Data

(63) Continuation of application No. 16/474,923, filed as application No. PCT/US2017/068741 on Dec. 28, 2017, now Pat. No. 11,223,217.

(60) Provisional application No. 62/439,737, filed on Dec. 28, 2016.

(51) Int. Cl.
  *H02J 7/00* (2006.01)
  *H02J 50/00* (2016.01)

(52) U.S. Cl.
  CPC ............ *H02J 7/0042* (2013.01); *H02J 7/00* (2013.01); *H02J 7/0013* (2013.01); *H02J 50/00* (2016.02)

(58) Field of Classification Search
  CPC .......... H02J 7/0042; H02J 7/00; H02J 7/0013; H02J 50/00
  See application file for complete search history.

(56) References Cited

U.S. PATENT DOCUMENTS

| | | | |
|---|---|---|---|
| 4,186,997 A | 2/1980 | Schumacher | |
| 8,400,104 B2 | 3/2013 | Adamczyk et al. | |
| 9,425,651 B2 | 8/2016 | Strauser | |
| 9,641,002 B2* | 5/2017 | Lavender | H02J 7/0045 |
| 10,180,251 B2 | 1/2019 | Duque | |
| 2006/0208697 A1 | 9/2006 | Chan et al. | |
| 2008/0164757 A1 | 7/2008 | Elgie et al. | |
| 2013/0181661 A1 | 7/2013 | Workman et al. | |
| 2014/0042962 A1 | 2/2014 | Thompson | |
| 2015/0137762 A1 | 5/2015 | Kim et al. | |
| 2015/0194839 A1* | 7/2015 | Wojcik | H04Q 11/00 320/108 |
| 2017/0271900 A1* | 9/2017 | Rose | H01R 25/006 |
| 2019/0305567 A1* | 10/2019 | Keeley | H02J 50/10 |

FOREIGN PATENT DOCUMENTS

WO 2016044726 3/2016

* cited by examiner

*Primary Examiner* — Michael C Zarroli
(74) *Attorney, Agent, or Firm* — Michael Best & Friedrich LLP

(57) ABSTRACT

A charging system includes a first charging portion and a second charging portion. The first charging portion includes at least one first connector and at least one first interface for charging a connected device. The first charging portion is configured to receive electrical current from a power source. The second charging portion includes at least one second connector and at least one second interface for charging a connected device. The at least one first connector is removably coupled to the at least one second connector, thereby removably coupling the second charging portion to the first charging portion to facilitate transmission of electrical current between the first charging portion and the second charging portion.

21 Claims, 5 Drawing Sheets

MODULAR DEVICE CHARGING SYSTEM

CROSS-REFERENCE TO RELATED APPLICATION

This application is a continuation of co-pending, prior-filed U.S. patent application Ser. No. 16/474,923, filed Jun. 28, 2019, which is a national phase entry of PCT Patent Application No. PCT/US2017/068741, filed Dec. 28, 2017, which claims the benefit of U.S. Provisional Patent Application No. 62/439,737, filed Dec. 28, 2016. The entire contents of these applications are hereby incorporated by reference.

BACKGROUND

The present disclosure relates to power charging systems, and particularly to charging systems for electronic devices.

Conventional charging devices provide a fixed assortment of sources for charging an electronic device and provide a single function (device charging). A device may be plugged in to one of several ports in order to be charged.

SUMMARY

In one aspect, a charging system includes a plurality of charging portions removably coupled to one another. The plurality of charging portions receives electrical current from a power source. Each of the charging portions includes at least one interface for charging a connected device and includes a connector for engaging an adjacent one of the charging portions.

In another aspect, a charging system includes a first charging portion and a second charging portion. The first charging portion includes at least one first connector and at least one first interface for charging a connected device. The first charging portion is configured to receive electrical current from a power source. The second charging portion includes at least one second connector and at least one second interface for charging a connected device. The at least one first connector removably coupled to the at least one second connector, thereby removably coupling the second charging portion to the first charging portion to facilitate transmission of electrical current between the first charging portion and the second charging portion.

The above-described and other features and advantages of the present disclosure will be appreciated and understood by those skilled in the art from the following detailed description and drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1A:
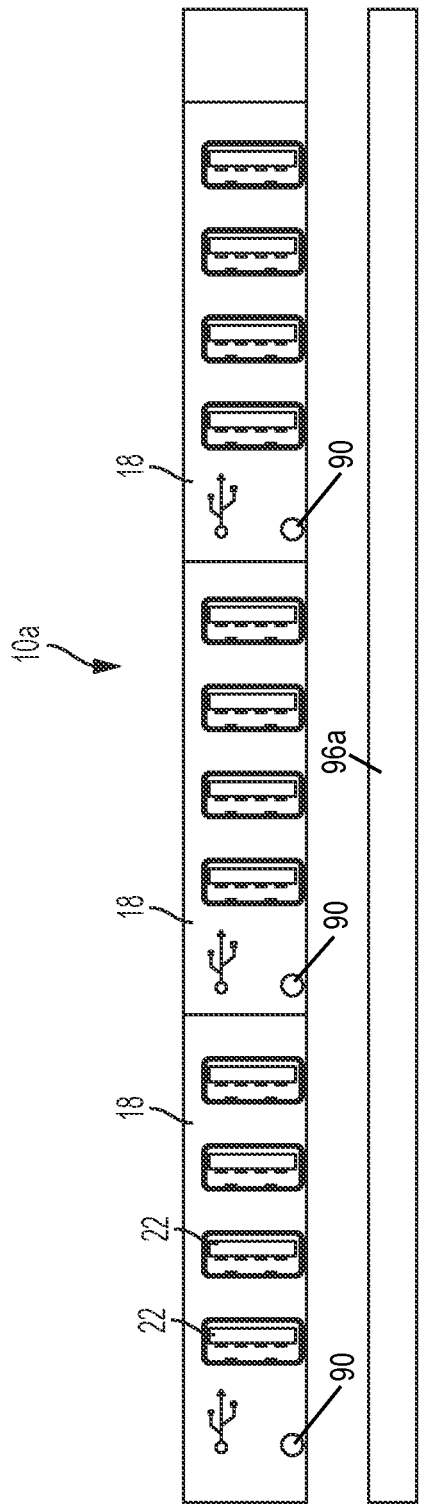
FIG. 1A is an elevation view of a charging system according to a first configuration.
Figure 1B:
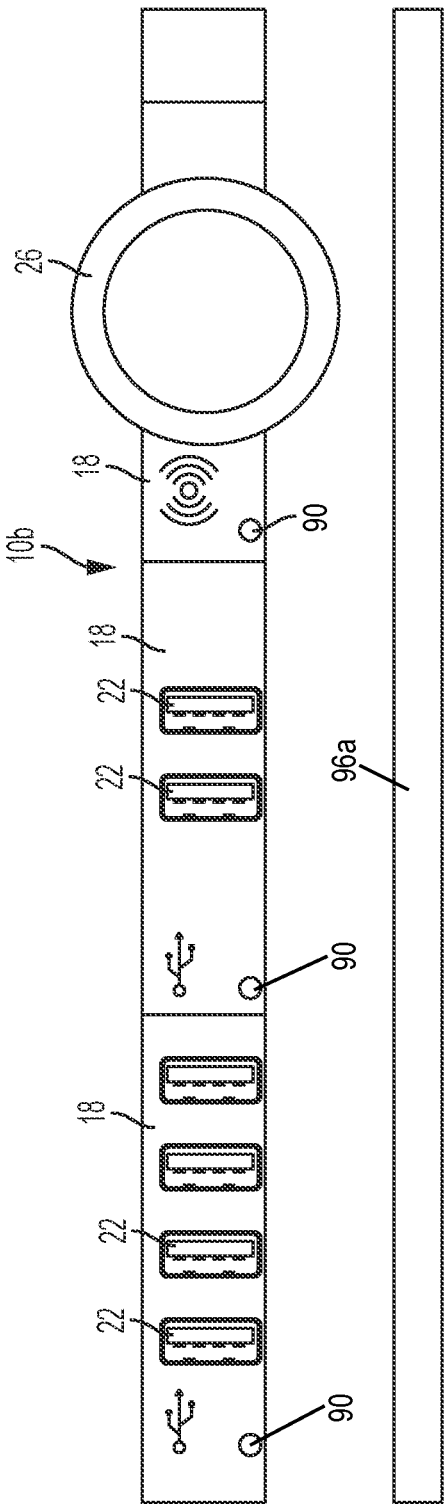
FIG. 1B is an elevation view of a charging system according to a second configuration.

FIG. 1 illustrates a charging system 10, e.g., for charging electronic devices such as a phone, a tablet, or a laptop (not shown). The charging system 10 includes multiple blocks or portions or segments 18 connected to one another in an end-to-end configuration. In the illustrated embodiment, each segment 18 includes multiple charging ports 22. For example, the charging system 10 of FIG. 1A includes three segments 18, and each segment 18 includes four ports 22 (e.g., a port for receiving a USB-type connector). In other embodiments, the charging system 10 may include fewer or more segments 18. In addition, as shown in FIG. 1B, each of the segments 18 may include fewer or more ports 22, and/or may include a different type of port (e.g., a wireless charging port 26). The segments 18 can be combined in various ways to achieve a desired configuration.

Figure 2:
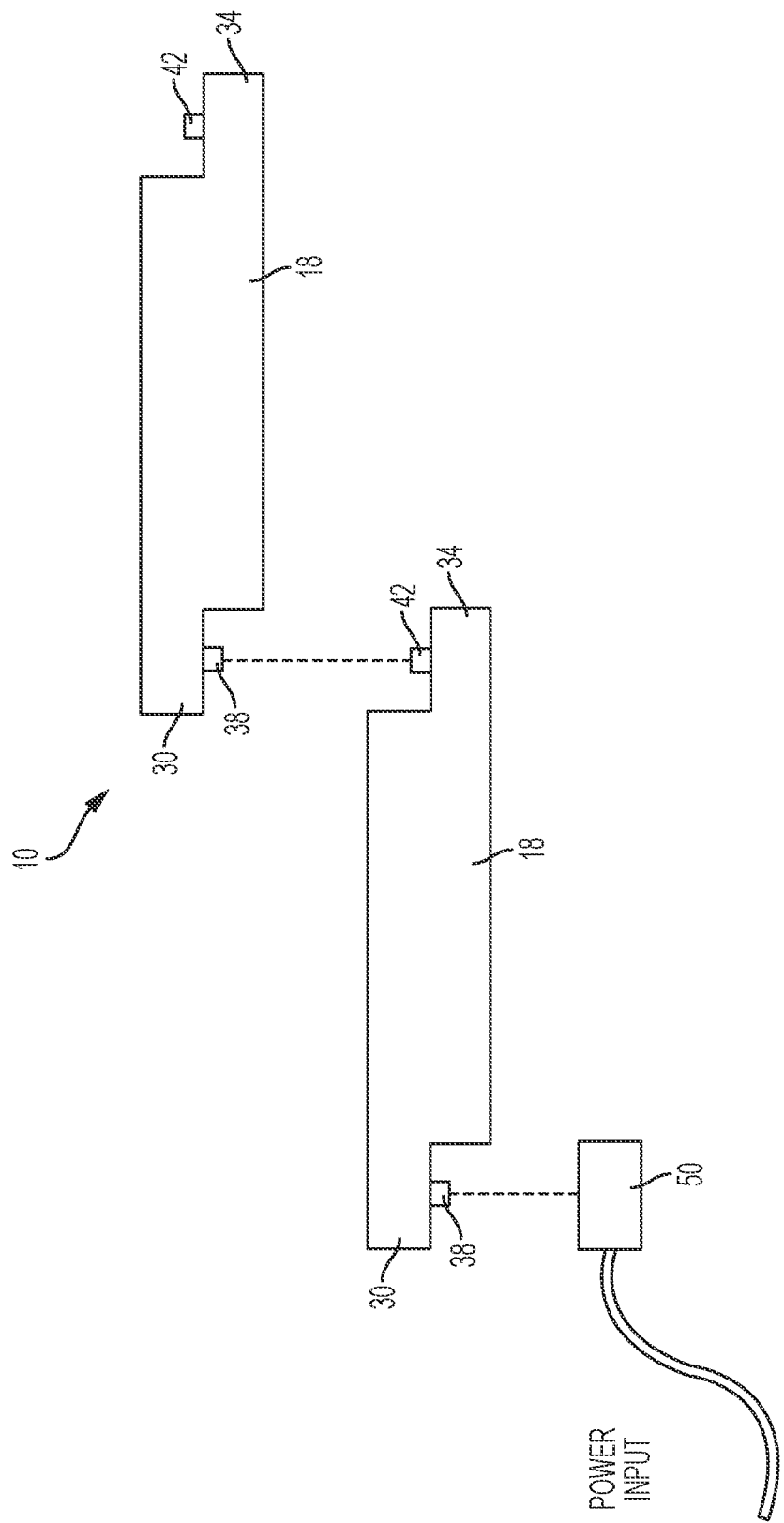
FIG. 2 is a side exploded view of the charging system of FIG. 1.

As shown in FIG. 2, each segment 18 includes a first end 30 and a second end 34. The first end 30 includes a first connector 38 and the second end 34 includes a second connector 42. Each first connector 38 is configured to be connected for electrical communication with the second connector 42 of an adjacent segment 18. In the illustrated embodiment, the first end 30 of each segment 18 is formed as an upper portion and the second end 34 of each segment 18 is formed as a lower portion; the first connector 38 is position on a lower surface of the upper portion, while the second connector 42 is positioned on an upper surface of the lower portion. In the illustrated embodiment, the upper portion of the first end 30 engages a lower portion of the second end 34 of an adjacent segment 18 in an overlapping configuration. In other embodiments, the segments 18 may be interconnected in a different manner.

In some embodiments, each connector 38, 42 includes a protrusion engaging a corresponding feature (e.g., an opening) on the associated portion of the adjacent segment 18. The protrusions and openings may alternate between the connectors 38, 42 (e.g., each connector 38, 42 may include a protrusion and an opening, such that the protrusion engages the opening of the other connector). In other embodiments, the connectors 38, 42 may include protrusions that engage each other directly. In still other embodiments, the connectors 38, 42 may be formed in a different manner, and/or the segments may be interconnected in a different manner. The electrical connections between the segments 18 can be made via an interlocking mechanical coupling rather than a wired connection. The coupling may be threaded, magnetic, spring, clip, interference, or some combination thereof. One of the connectors 38, 42 of an end segment 18 of the charging system 10 is connected to a power input, e.g., a plug 50 in electrical communication with a power source.

Figure 3A:
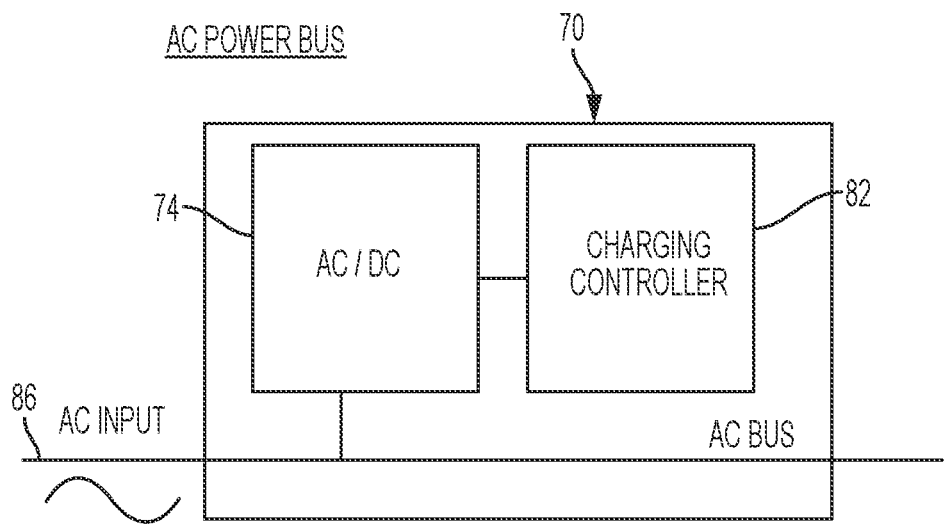
FIG. 3A is a schematic view of an AC power bus for a charging system.
Figure 3B:
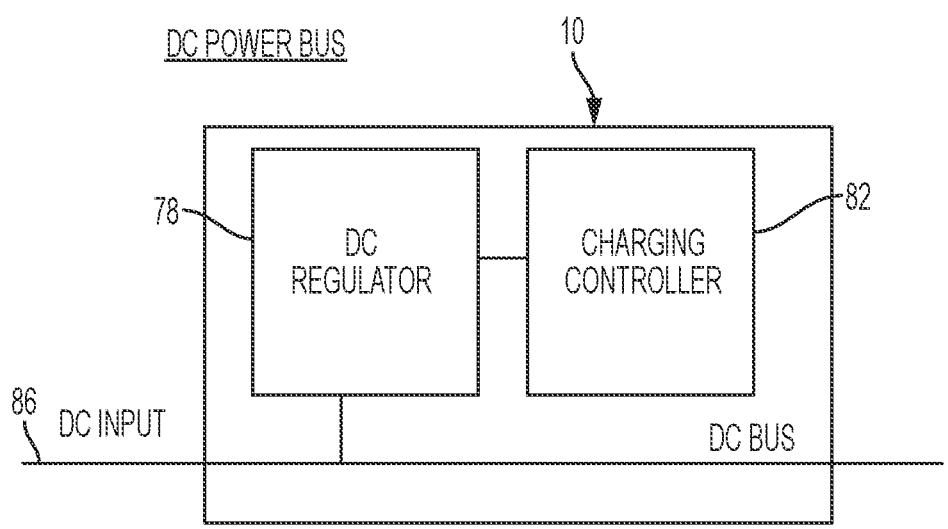
FIG. 3B is a schematic view of a DC power bus for a charging system.

As shown in FIG. 3, the charging system 10 may include a power bus 70 configured to receive an AC input or a DC input. For an AC input (FIG. 3A), the charging system 10 includes a rectifier 74 for converting the input current to DC current. For a DC input (FIG. 3B), the current passes through a regulator 78. In each case, the current flowing to the ports 22 (and therefore to the electronic devices) may be controlled by a controller 82. The charging system 10 may connect to a standard AC or DC mains 86 or an alternative power supply or inverter. The power bus connection may be made by a threaded, spring contact, or connector system, or some combination thereof.

Figure 4A:
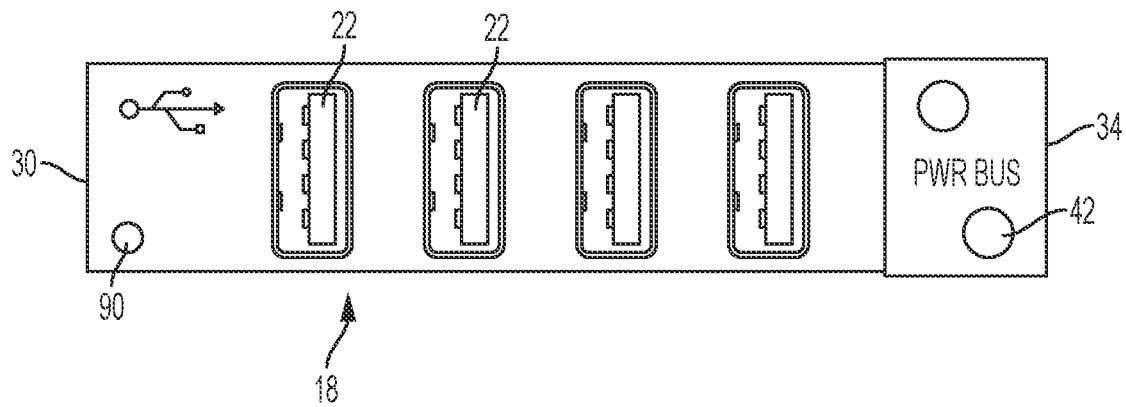
FIG. 4A is a plan view of a segment of a charging system.
Figure 4B:
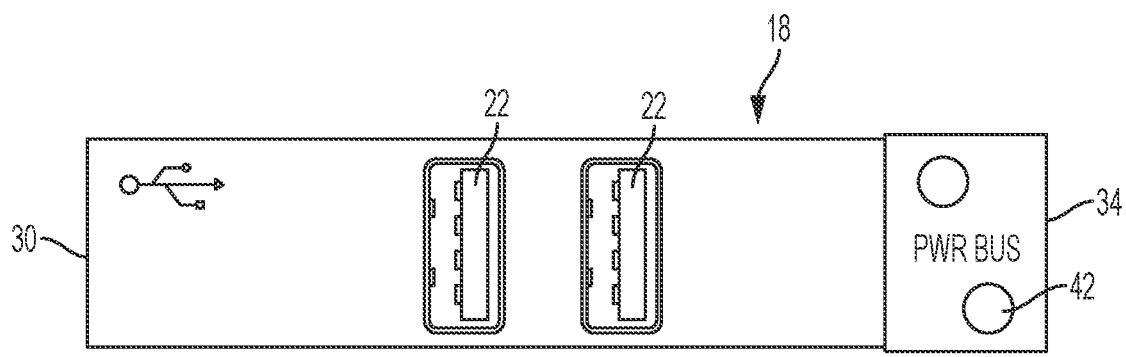
FIG. 4B is a plan view of a segment of a charging system according to another embodiment.
Figure 4C:
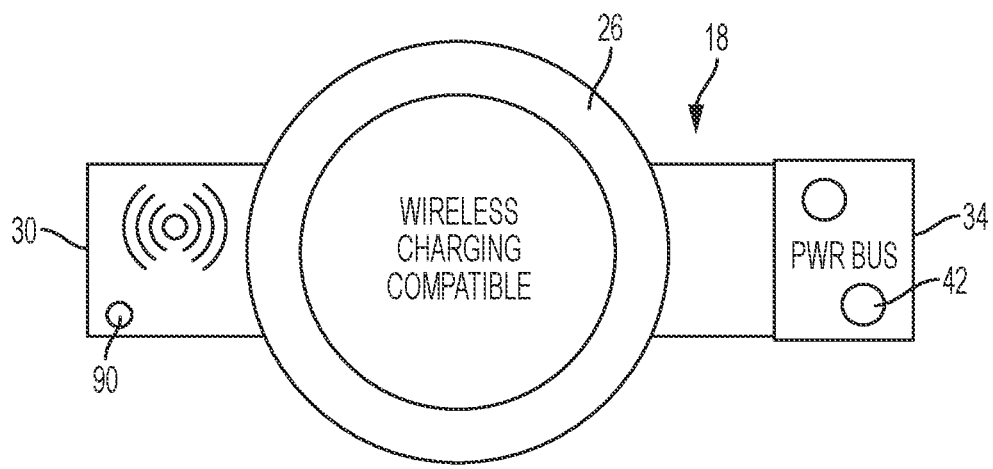
FIG. 4C is a plan view of a segment of a charging system according to yet another embodiment.

As shown in FIGS. 4A-4C, each segment 18 may include various numbers and types of ports 22. For example, as shown in FIG. 4A, a segment 18 may include four ports 22 for receiving a USB-type connector. As shown in FIG. 4B, a segment 18 may include two ports 22 for receiving a USB-type connector. As shown in FIG. 4C, a segment 18 may include a wireless charging port 26. That is, the segments 18 can provide a variety of functions. In addition, electronic communications can be included in one or more segments 18 to transmit a signal (e.g., via Bluetooth, Wi-Fi, near-field communication, Ethernet, and/or an app). In some embodiments, the signal may indicate to external devices (e.g., a smartphone or tablet) the location of the charging system 10 and its status, for example, that it is available for use. This system could assist users in locating a nearby available charger and/or alert users when a port 22 becomes available. This program could be implemented in various ways, including software beacons (not shown) running an operating system (e.g. iOS, Android, etc.).

In addition, a segment 18 may include a backup battery, as well as an energy harvesting device (e.g., solar cell), either alone or in combination with the backup battery. One or more segments 18 may include an information display to provide the system status, the charging status, or to provide space for advertisements. One or more segments 18 may also include one or more light-emitting elements 90 (e.g., a light emitting diode or LED—FIGS. 4A and 4C) for safety, aesthetics, or other purposes.

Because the segments 18 are interchangeable and can be linked together in communication with a common power bus 70, the charging system 10 provides greater flexibility and serviceability, and can be more easily upgraded. The modular nature of the segments 18 permits the system to be configured in various ways, and to include one or more segments 18, depending on the power bus capacity. In one embodiment, a maximum power rating for each segment 18 including four ports 22 (e.g., FIG. 4A) is calculated for a power consumption of 5 W for each port, corresponding to a total of 20 W. A maximum number of segments 18 connected in series could then be determined based on a target rating.

Each segment 18 is a pre-built assembly that may be formed from plastic, metal, resin, or some combination thereof, and may be assembled by threaded, magnetic, clip, or interference connections, or some combination thereof. Each segment 18 can be connected to other segments 18 to provide a customizable charging system 10. The segments 18 may communicate with each other through the power bus 70, additional connections, or wireless methods.

Figure 5:
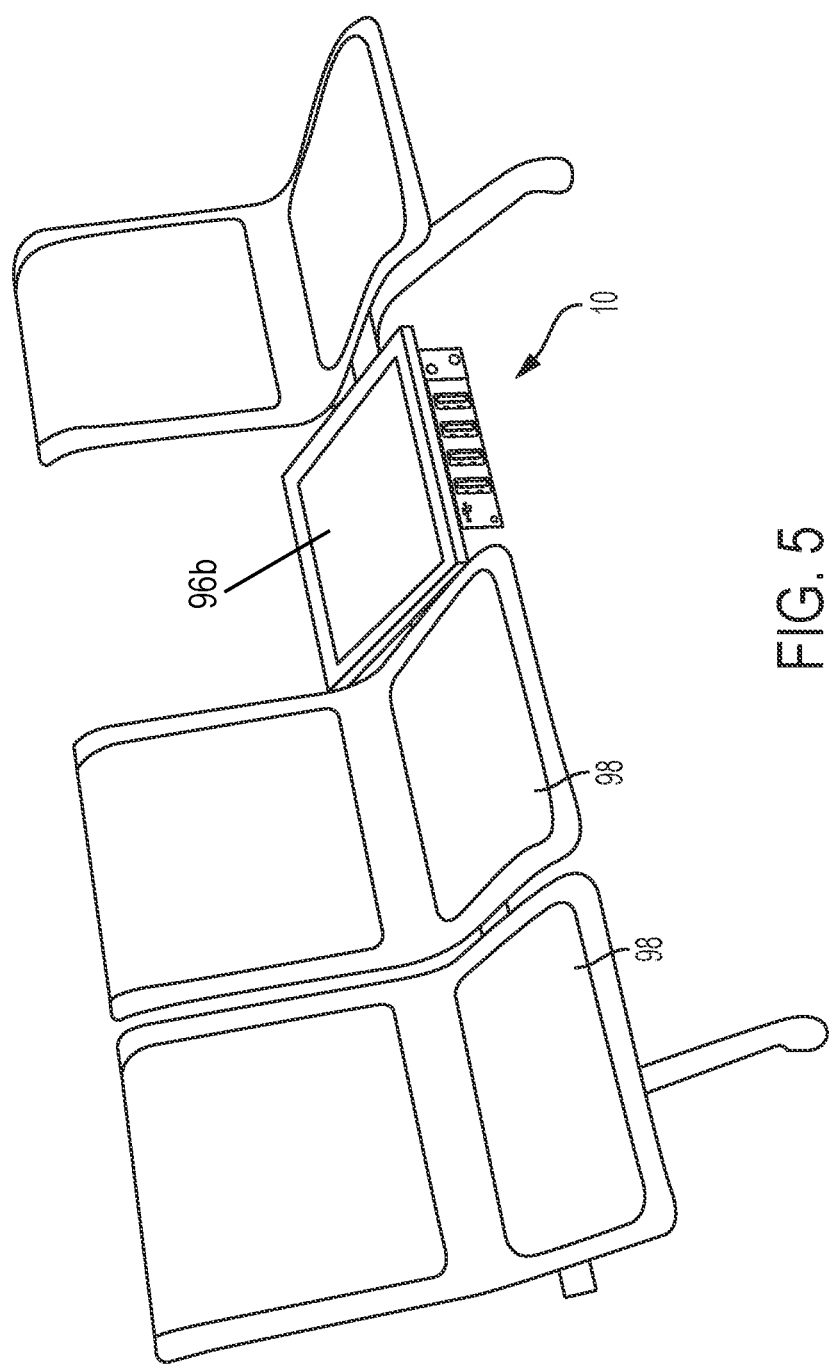
FIG. 5 is a perspective view of the charging system of FIG. 1 coupled to a shelf.

The charging system 10 may be positioned adjacent a shelf 96. For example, for a charging system 10 mounted on a wall as shown in FIG. 1, the shelf 96a may be positioned below the charging system 10 to support the device(s) to be charged. In other embodiments, the shelf 96b (FIG. 5) may be positioned adjacent seats 98 in a public environment such as an airport terminal or waiting area. In other embodiments, the charging system 10 could be incorporated into other structures, such as benchtops, armrests, etc.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. A charging system comprising:
a plurality of charging portions removably coupled to one another, each of the charging portions including a first connector and a second connector, the first connector configured to interchangeably connect to a power source and the second connector of another charging portion, each of the charging portions including a plurality of interfaces including at least one port for receiving a plug and at least one wireless charging port for charging a plurality of connected devices.

2. The charging system of claim 1, wherein a connector of one of the charging portions includes a protrusion engaging a connector of the adjacent one of the charging portions.

3. The charging system of claim 1, wherein the charging portions engage one another in an end-to-end configuration.

4. The charging system of claim 1, wherein one of the charging portions includes an end portion engaging an end portion of an adjacent charging portion in an overlapping configuration.

5. The charging system of claim 1, wherein a first one of the charging portions includes an upper portion and a second one of the charging portions includes a lower portion, wherein a first connector is positioned on a lower surface of the upper portion, and a second connector is positioned on an upper surface of the lower portion, the second connector removably engaging the first connector to provide electrical communication between the first one of the charging portions and the second one of the charging portions.

6. The charging system of claim 1, wherein at least one of the charging portions includes a wireless communication device for transmitting a signal to an external device, the signal indicative of at least one of a location and a status of the charging portion.

7. The charging system of claim 1, wherein at least one of the charging portions includes a battery.

8. The charging system of claim 1, wherein each of the charging portions can be interchangeably connected to one another, wherein at least one of the number and configuration of connected charging portions is selected based on a maximum power consumption.

9. A charging system comprising:
a first charging portion including at least one first connector and a plurality of first interfaces including at least one first port that receives a plug and at least one first wireless charging port for charging a plurality of connected devices; and
a second charging portion including at least one second connector configured to interchangeably connect to the at least one first connector of the first charging portion and a power source, the second charging portion including a plurality of second interfaces including at least one second port that receives a plug and at least one second wireless charging port for charging a plurality of connected devices, the at least one first connector configured to be removably coupled to the at least one second connector, thereby removably coupling the second charging portion to the first charging portion to facilitate transmission of electrical current between the first charging portion and the second charging portion.

10. The charging system of claim 9, further comprising a third charging portion including at least one third connector and at least one third interface for charging a connected device, the at least one third connector removably coupling the third charging portion to the second charging portion and facilitating transmission of electrical current between the third charging portion and the second charging portion, wherein the second charging portion is positioned between the first charging portion and the third charging portion.

11. The charging system of claim 9, wherein the first charging portion and second charging portion engage one another in an end-to-end configuration.

12. The charging system of claim 9, wherein the first charging portion includes an end portion engaging an end portion of the second charging portion in an overlapping configuration.

13. The charging system of claim 9, wherein the first charging portion includes a lower portion and the second charging portion includes an upper portion, wherein the first connector is positioned on an upper surface of the lower portion, and the second connector is positioned on a lower surface of the upper portion, the second connector removably engaging the first connector to provide electrical communication between the first charging portion and the second charging portion.

14. The charging system of claim 9, wherein at least one of the first charging portion and the second charging portion includes a wireless communication device for transmitting a signal to an external device, the signal indicative of at least one of a location and a status of the charging portion.

15. The charging system of claim 9, wherein at least one of the first charging portion and the second charging portion includes a battery.

16. The charging system of claim 9, wherein each of the first charging portion and the second charging portion can be interchangeably connected to one another, wherein at least one of the number and configuration of connected charging portions is selected based on a maximum power consumption.

17. The charging system of claim 9, wherein the first interface is a first type of interface, wherein the second interface is a second type of interface different from the first type of interface.

18. The charging system of claim 1, wherein at least one of the charging portions includes one or more selected from a group consisting of a backup battery and an energy harvesting component.

19. The charging system of claim 1, wherein at least one of the charging portions includes an information display configured to display one or more selected from a group consisting of system status, charging status, and paid advertisements.

20. The charging system of claim 9, wherein the first charging portion and the second charging portion include one or more selected from a group consisting of a backup battery and an energy harvesting component.

21. The charging system of claim 9, wherein the first charging portion and the second charging portion include an information display configured to display one or more selected from a group consisting of system status, charging status, and paid advertisements.

* * * * *